(12) United States Patent
Oono et al.

(10) Patent No.: US 9,897,395 B2
(45) Date of Patent: Feb. 20, 2018

(54) TANK FOR HEAT EXCHANGER, AND METHOD FOR MANUFACTURING THE SAME

(71) Applicant: DENSO CORPORATION, Kariya, Aichi-pref. (JP)

(72) Inventors: Shingo Oono, Chiryu (JP); Michiyasu Yamamoto, Chiryu (JP); Yoshinori Ishihara, Hekinan (JP); Masaei Mitomi, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 722 days.

(21) Appl. No.: 14/377,020

(22) PCT Filed: Jan. 23, 2013

(86) PCT No.: PCT/JP2013/000295
§ 371 (c)(1),
(2) Date: Aug. 6, 2014

(87) PCT Pub. No.: WO2013/121699
PCT Pub. Date: Aug. 22, 2013

(65) Prior Publication Data
US 2015/0014324 A1    Jan. 15, 2015

(30) Foreign Application Priority Data
Feb. 17, 2012    (JP) .................. 2012-032556

(51) Int. Cl.
*F28F 9/00* (2006.01)
*B29C 45/00* (2006.01)
(Continued)

(52) U.S. Cl.
CPC .......... *F28F 9/005* (2013.01); *B29C 45/0005* (2013.01); *B29C 45/0025* (2013.01);
(Continued)

(58) Field of Classification Search
CPC ............ B29C 45/0005; B29C 45/0025; B29C 45/0046; B29C 2045/0027; F28F 9/02;
(Continued)

(56) References Cited

U.S. PATENT DOCUMENTS

| 4,316,503 A | 2/1982 | Kurachi et al. |
| 5,613,550 A * | 3/1997 | Ashida .................. F28F 9/002 |
| | | 165/173 |

(Continued)

FOREIGN PATENT DOCUMENTS

| CN | 1120995 A | 4/1996 |
| JP | S5656595 A | 5/1981 |

(Continued)

OTHER PUBLICATIONS

Office Action dated Sep. 1, 2015 in the corresponding JP Application No. 2012-032556 with English Abstract.

(Continued)

*Primary Examiner* — Tho V Duong
(74) *Attorney, Agent, or Firm* — Harness, Dickey & Pierce, P.L.C.

(57) ABSTRACT

A tank includes a tank wall that has an opening, which is configured into a generally rectangular form that extends in a longitudinal direction and a lateral direction while a cross section of the tank wall, which is perpendicular to the longitudinal direction of the opening, is curved, and a tank foot is formed to extend all around the opening of the tank wall. A gate position is placed in a longitudinal center portion of one side surface of the tank foot, which extends in the longitudinal direction of the tank wall.

14 Claims, 11 Drawing Sheets

(51) Int. Cl.
*F28F 9/02* (2006.01)
*F28F 21/06* (2006.01)
*B29D 22/00* (2006.01)
B29K 101/00 (2006.01)
B29K 307/04 (2006.01)
B29K 309/08 (2006.01)
B29L 22/00 (2006.01)

(52) U.S. Cl.
CPC ........ *B29C 45/0046* (2013.01); *B29D 22/003* (2013.01); *F28F 9/0226* (2013.01); *F28F 21/067* (2013.01); B29C 2045/0027 (2013.01); B29K 2101/00 (2013.01); B29K 2307/04 (2013.01); B29K 2309/08 (2013.01); B29L 2022/00 (2013.01); F28F 2225/08 (2013.01); F28F 2255/14 (2013.01)

(58) Field of Classification Search
CPC ...... F28F 9/0226; F28F 9/0219; F28F 9/0224; F28F 21/067; F28F 9/005; F28F 2255/14; F28F 2225/08; B29D 22/003; B29K 2309/08; B29K 2101/00; B29K 2307/04; B29L 2022/00
USPC .................................. 165/173; 425/542, 569
See application file for complete search history.

(56) References Cited

U.S. PATENT DOCUMENTS

| | | | | |
|---|---|---|---|---|
| 5,979,546 A | * | 11/1999 | Stolarski | F28F 9/0226 165/149 |
| 6,238,610 B1 | * | 5/2001 | Yamazaki | B29C 45/0025 264/267 |
| 7,562,697 B2 | * | 7/2009 | Gorbounov | F25B 39/028 165/174 |
| 2010/0116482 A1 | * | 5/2010 | Goto | C08L 77/06 165/173 |
| 2012/0175096 A1 | * | 7/2012 | Hakamata | B29C 45/14336 165/173 |

FOREIGN PATENT DOCUMENTS

| | | | | |
|---|---|---|---|---|
| JP | 03142214 A | * | 6/1991 | ......... B29C 45/0025 |
| JP | H03142214 A | | 6/1991 | |
| JP | H03142215 A | | 6/1991 | |
| JP | H09264690 A | | 10/1997 | |
| JP | H11342517 A | | 12/1999 | |

OTHER PUBLICATIONS

Office Action dated Aug. 25, 2015 in corresponding Chinese Application No. 201380009794.1.

International Search Report and Written Opinion (in Japanese with English Translation) for PCT/JP2013/000295, dated Mar. 12, 2013; ISA/JP.

* cited by examiner

FIG. 5 (a)  PRIOR ART
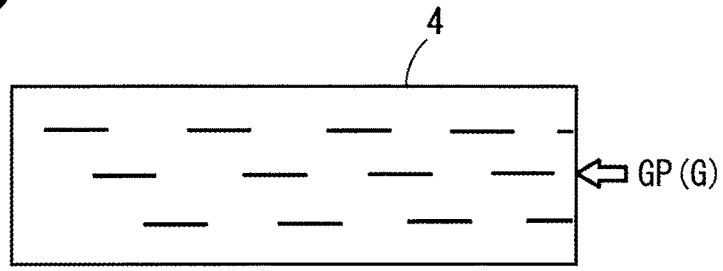
FIG. 5 (b)  PRIOR ART
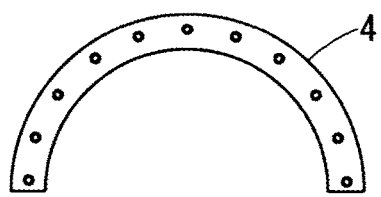
FIG. 6 (a)
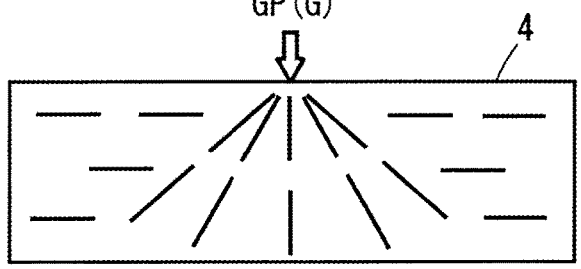
FIG. 6 (b)
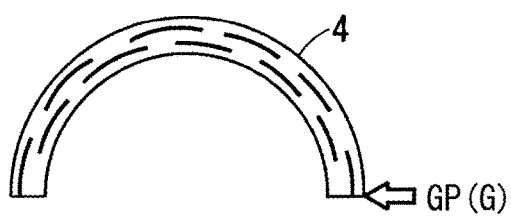

PRIOR ART

TANK FOR HEAT EXCHANGER, AND METHOD FOR MANUFACTURING THE SAME

CROSS REFERENCE TO RELATED APPLICATION

This application is a U.S. National Phase Application under 35 U.S.C. 371 of International Application No. PCT/JP2013/000295 filed on Jan. 23, 2013 and published in Japanese as WO 2013/121699 A1 on Aug. 22, 2013. This application is based on Japanese Patent Application No. 2012-032556 filed on Feb. 17, 2012. The entire disclosures of all of the above applications are incorporated herein by reference.

TECHNICAL FIELD

The present disclosure relates to a resin tank of a heat exchanger used as, for example, a radiator in a cooling system of an engine, or a heater core for heating air.

BACKGROUND ART

For example, a heat exchanger recited in Patent Literature 1 includes a tank that is formed by using synthetic resin, in which glass fibers are added as a reinforcing material.

As shown in FIGS. 16 and 17, this tank 100 has a cross-section, in which a ceiling portion is curved, and this tank 100 forms an opening that is configured into a generally rectangular form (a generally oblong form). Furthermore, the tank 100 has a tank foot 110, which extends all around the opening of the tank 100. A core plate is fixed to the tank foot 110 by crimping through an undepicted packing. At the time of molding the tank 100, in view of good flow of the resin and shortening of the filling time of the resin, an opening of a gate G at a cavity of an injection molding die, i.e., a gate position GP (indicated with an arrow in the drawing), which forms a filling port of the resin, is often placed in a longitudinal end part of the tank 100 (a lateral surface of the tank 100), as shown in FIG. 14, or a top part of the tank 100 in a tank longitudinal center portion, as shown in FIG. 15.

Furthermore, the Patent Literature 2 discloses that at the time of molding the tank 100 that has a projection, such as a pipe, locally placed at one of two opposed longitudinal surfaces of the tank 100, two gate positions GP are respectively placed in a lateral surface of the tank 100 and the other one of the longitudinal surfaces of the tank 100, which does not have the projection, as shown in FIG. 18. According to the above prior art technique, a flow of the resin can be disturbed at the other one of the longitudinal surfaces, which does not have the projection. Therefore, shrinkage of the resin after the molding can be balanced between the side, which has the projection, and the other side, which does not have the projection. In this way, warping of the tank 100 can be limited.

However, in the case of FIG. 14, in which the gate position GP is placed in the lateral surface of the tank 100, and the case of FIG. 15, in which the gate position GP is placed in the top part in the center portion of the tank 100, the resin flows in the longitudinal direction (the left-right direction in FIG. 15) of the tank 100 at the top part of the tank 100 (the location, at which a center line O passes). The flow of the resin at this tank top part is a flow in a non-reinforcing direction with respect to a direction (an E-E direction, an F-F direction) of deformation of the tank 100, which is caused by an internal pressure load of the tank 100, as shown in FIGS. 16 and 17. That is, the glass fibers, which are added in the resin, are oriented in the longitudinal direction of the tank 100 (a direction perpendicular to a plane of the drawing). This is disadvantageous with respect to the strength and durability of the tank 100. FIG. 16 is a cross-sectional view taken along line XVI-XVI in FIG. 14, and FIG. 17 is a cross-sectional view taken along line XVII-XVII in FIG. 15.

Furthermore, in the case where the gate position GP is placed in the top part in the tank center portion, the gate position GP is located in a generating part of the maximum stress in the tank 100 caused by the internal pressure load. Therefore, the strength of the tank 100 may be disadvantageously deteriorated by a residual stress at the gate position GP.

In the prior art technique disclosed in the Patent Literature 2, the gage position GP is placed at the two locations, which are located in the lateral surface and the longitudinal surface, respectively, of the tank 100. Therefore, as shown in FIG. 18, the flow of the resin, which is filled from the gate position GP placed in the lateral surface of the tank 100, and the flow of the resin, which is filled from the other gate position GP placed in the longitudinal surface of the tank 100, are merged together from the different directions, respectively. Thus, a weld line is generated in a location, which is indicated by a dotted line in the drawing. This weld line is generated in the tank ceiling portion, which receives the maximum influence of the internal pressure load. Therefore, the strength and the durability of the tank 100 may be disadvantageously deteriorated.

Furthermore, in the structure of the Patent Literature 2, as shown in FIG. 19, the flow of the resin may be rapidly changed at the area adjacent to the projection 120. Thus, a substantial disorder may be generated in the orientation of the glass fibers. That is, in comparison to an H part in FIG. 19, at which the glass fibers are oriented uniformly in the longitudinal direction of the tank 100, the rapid change is generated in the orientation of the glass fibers at the area adjacent to the projection 120, as indicated in an I part in FIG. 19. Therefore, the strength of the tank 100 relative to the internal pressure load of the tank 100 tends to be deteriorated.

CITATION LIST

Patent Literatures

PATENT LITERATURE 1: JPS56-56595A (corresponding to U.S. Pat. No. 4,316,503A)
PATENT LITERATURE 2: JPH03-142214A

SUMMARY OF THE INVENTION

The present disclosure is made in view of the above matters, and it is an objective of the present disclosure to provide a tank of a heat exchanger and a method for manufacturing the same, which can improve strength and durability of the tank against an internal pressure load by appropriately placing a gate position.

In order to achieve the above objective, according to the present disclosure, there is provided a tank for a heat exchanger, including a tank wall that has an opening, which is configured into a generally rectangular form that extends in a longitudinal direction and a lateral direction that are perpendicular to each other, wherein a cross section of the tank wall, which is perpendicular to the longitudinal direction of the opening, is curved, and a tank foot is formed to extend all around the opening of the tank wall and is configured to be joined with a core plate. The tank wall is a resin-molded product that is molded by filling fiber-mixed resin, in which fibers are added as a reinforcing material, into an injection molding die, and a gate position, which forms a filling port of the fiber-mixed resin, is placed in at least one location only in one side surface of the tank foot, which extends in the longitudinal direction of the tank wall.

Furthermore, in order to achieve the above objective, according to the present disclosure, there is provided a tank for a heat exchanger, including a tank wall that has an opening, which is configured into a generally square form that extends in a first direction and a second direction that are perpendicular to each other, wherein a cross section of the tank wall, which is perpendicular to the first direction of the opening, is curved, and a tank foot is formed to extend all around the opening of the tank wall and is configured to be joined with a core plate. The tank wall is a resin-molded product that is molded by filling fiber-mixed resin, in which fibers are added as a reinforcing material, into an injection molding die. A gate position, which forms a filling port of the fiber-mixed resin, is placed in at least one location only in one side surface of the tank foot, which extends in the first direction.

Furthermore, in order to achieve the above objective, according to the present disclosure, there is provided a method for manufacturing a tank of a heat exchanger that includes a tank wall that has an opening, which extends in a first direction and a second direction that are perpendicular to each other, wherein a cross section of the tank wall, which is perpendicular to the first direction of the opening, is curved, and a tank foot is formed to extend all around along the opening of the tank wall and is configured to be joined with a core plate. The method includes: injecting fiber-mixed resin, which is in a molten state and includes fibers added as a reinforcing material, into a cavity of an injection molding die through at least one gate provided only in one side wall of the cavity, which forms one side surface of the tank foot that extends in the first direction, so that the tank wall is molded in the cavity; cooling and solidifying the tank wall, which is molded in the cavity; and removing the tank wall, which is solidified, from the cavity of the injection molding die.

BRIEF DESCRIPTION OF DRAWINGS

FIG. 5(a) is a schematic diagram of a tank along a longitudinal direction, showing a flow of resin of a prior art model, and FIG. 5(b) is a schematic diagram showing a curved shape of the tank in a cross section of the tank, which is perpendicular to the longitudinal direction of FIG. 5(a).

FIG. 6(a) is a schematic diagram of the tank along a longitudinal direction, showing a flow of resin of the first embodiment, and FIG. 6(b) is a schematic diagram showing a curved shape of the tank in a cross section of the tank, which is perpendicular to the longitudinal direction of FIG. 6(a).

DESCRIPTION OF EMBODIMENTS

Embodiments of the present disclosure will be hereinafter described in detail.

EMBODIMENTS

First Embodiment

In a first embodiment of the present disclosure, there will be described an example, in which a principle of the present disclosure is applied to a tank of a radiator used in an engine cooling system of an automobile.

The radiator includes a radiator core, which exchanges heat between engine coolant and external air, and a pair of tanks 1, which are placed at an upper end part and a lower end part, respectively, of the radiator core.

Figure 1:
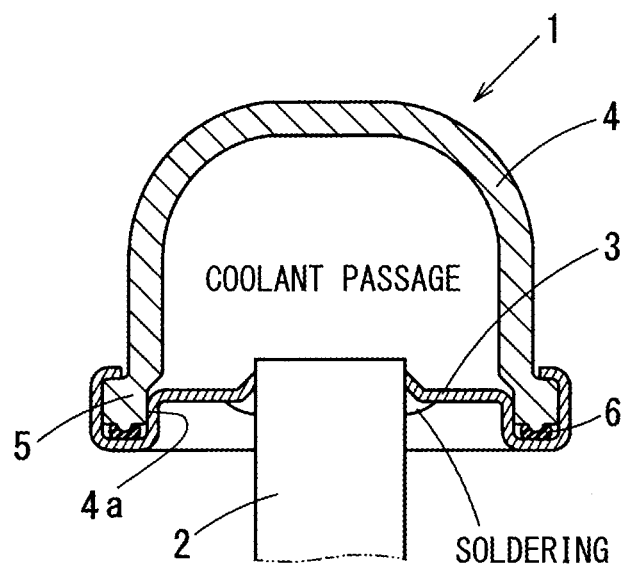
FIG. 1 is a cross-sectional view of a tank, to which a radiator core is installed, according to a first embodiment of the present disclosure.

As shown in FIG. 1, the radiator core includes: planar tubes 2, which conduct coolant; radiator fins (not shown), which are installed such that the radiator fins contact surfaces of the tubes 2; and core plates 3, each of which is used to fix the radiator core and the corresponding tank 1 together. The radiator core is assembled in a state where two end parts of each tube 2 are inserted through the core plates 3, respectively, and the assembled radiator core is integrally joined by, for example, soldering in a furnace.

The tubes 2, the radiator fins, and the core plates 3 are made of metal, such as aluminum, which has high heat conductivity and light weight and can be easily processed.

Figure 2:
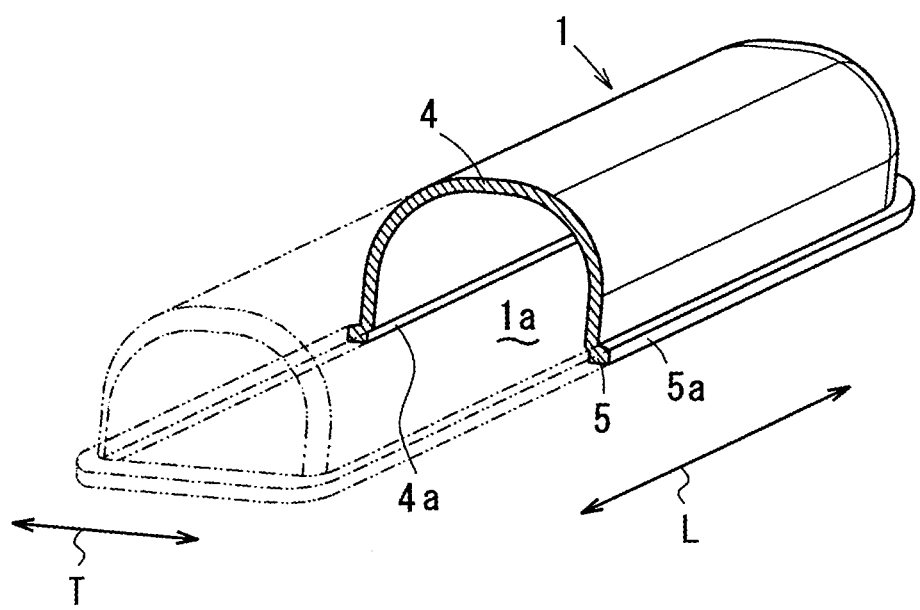
FIG. 2 is a perspective view of the tank of the first embodiment.

As shown in FIG. 2, the tank 1 is formed by a tank wall 4, which is elongated in a longitudinal direction L. An opening end 4a of the tank wall 4 has an opening 1a configured into a generally rectangular form (a generally oblong form) that extends in the longitudinal direction (a first direction) L and a lateral direction (a second direction) T, which are perpendicular to each other. A cross section of the tank wall 4, which is perpendicular to the longitudinal direction L of the opening 1a, is curved. The tank wall 4 has a tank foot (a flange portion) 5, which is configured into a flange form and is formed to extend all around the opening 1a of the tank wall 4.

As shown in FIG. 1, the radiator core and the tank 1 are assembled such that an end part of the core plate 3 is fixed to the tank foot 5 by crimping through a packing 6 to form a coolant passage in an inside of the tank 1. The packing 6 is made of a material, such as EPDM (ethylene propylene rubber), which has resiliency. In the state where the end part of the core plate 3 is fixed to the tank foot 5 by crimping, the packing 6 is compressed and is clamped between an end surface of the tank foot 5 and the core plate 3.

Figure 3:
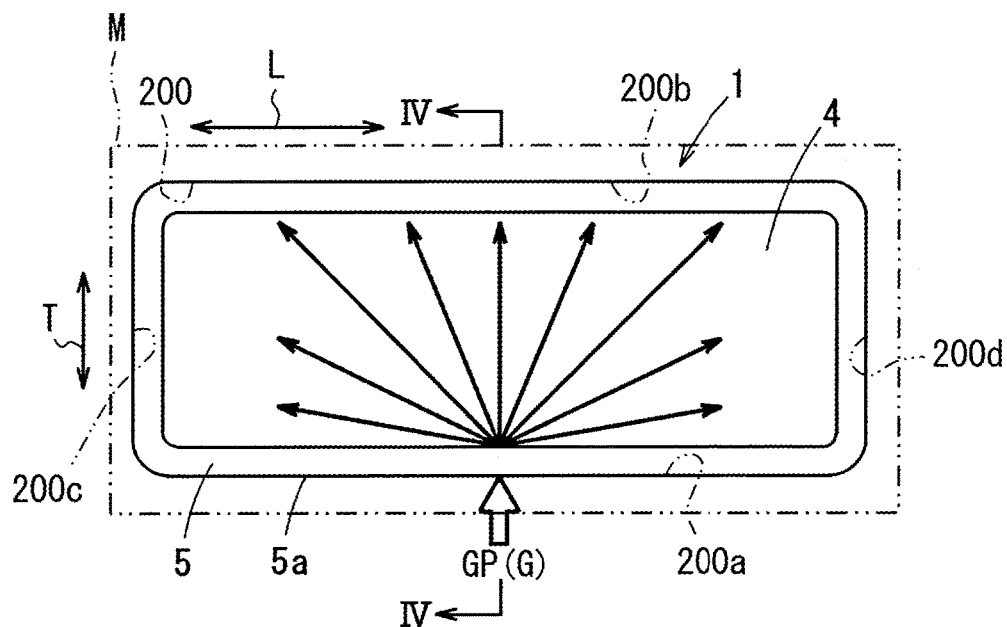
FIG. 3 is a plan view of the tank for describing a flow of resin according to the first embodiment.

The tank 1 (more specifically, the tank wall 4) is a resin molded product, which is molded by filling fiber-mixed resin produced by adding fibers into, for example, polyamide resin as a reinforcing material, into a cavity 200 of an injection molding die M shown in FIG. 3 through a gate G. As shown in FIG. 3, an opening of a gate G of the cavity 200, i.e., a gate position GP (indicated by an arrow in FIG. 3), which forms a filling port of the fiber-mixed resin, is placed only in one side surface 5a of the tank foot 5, which extends in the longitudinal direction L of the tank wall 4. This gate position GP is placed in one location in a center portion of the tank foot 5, which is centered in the longitudinal direction L. Specifically, the gate G is placed in the one location in the longitudinal center portion of one side wall 200a, which forms the side surface 5a of the tank foot 5, among side walls 200a-200d of the cavity 200, which surround the tank foot 5.

Figure 4:
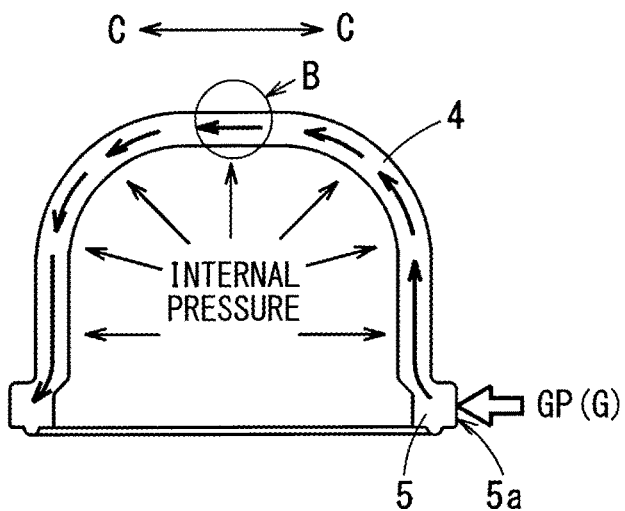
FIG. 4 is a cross-sectional view of the tank taken along line IV-IV in FIG. 3.

As discussed above, when the gate position GP is placed in the one location in the center portion of the tank foot 5 that is centered in the longitudinal direction L, the resin, which is filled into the cavity 200 at the gate position GP, radially flows, as indicated by arrows in the drawing. In this case, in the center portion of the tank 1, which is centered in the longitudinal direction L, as shown in FIG. 4, there is generated a flow of the resin in a direction along a curved cross section of the tank wall 4. Therefore, in a ceiling portion (a part B in FIG. 4) of the longitudinal center portion of the tank 1, which has a maximum stress generated in response to an internal pressure load, the flow of the resin is generated in a reinforcing direction with respect to a direction (a C-C direction in FIG. 4) of deformation of the tank 1 caused by the internal pressure load to uniformly orient the glass fibers in the direction of deformation of the tank 1. FIG. 4 is a cross-sectional view of the tank 1 taken along line IV-IV in FIG. 3.

Here, an analysis result of the internal stress generated by the tank internal pressure is compared between a tank model (hereinafter referred to as a prior art model) of a prior art, in which the gate position GP is placed at one location in a center portion of the tank foot 5 centered in a lateral direction T of the tank 1, and a tank model (hereinafter referred to as a present embodiment model) of the present embodiment, in which the gate position GP is placed in the one location in the center portion of the tank foot 5 that is centered in the longitudinal direction L. FIGS. 5(a) and 5(b) show the flow of the resin (the orientation of the glass fibers) of the prior art model. Specifically, FIG. 5(a) is a schematic diagram showing a longitudinal direction L of the tank 1, and FIG. 5(b) is a schematic diagram showing a cross-section of the tank 1 (a curved form of the tank wall 4) in a plane, which is perpendicular to the longitudinal direction L of the tank 1. FIGS. 6(a) and 6(b) show the flow of the resin (the orientation of the glass fibers) of the present embodiment model. Specifically, FIG. 6(a) is a schematic diagram showing a longitudinal direction L of the tank 1, and FIG. 6(b) is a schematic diagram showing a cross-section of the tank 1 (a curved form of the tank wall 4) in a plane, which is perpendicular to the longitudinal direction L of the tank 1.

Figure 7:
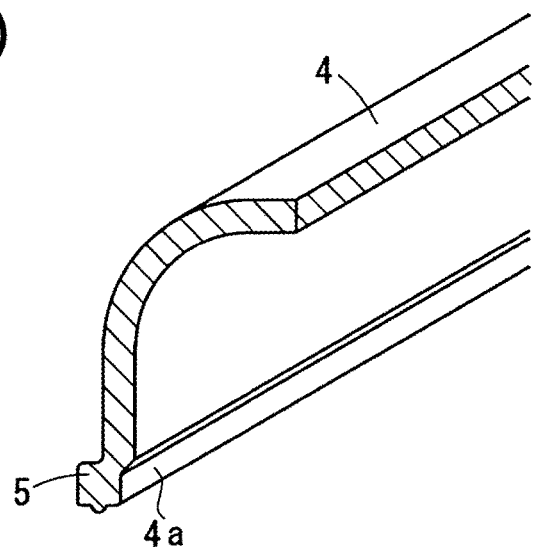
FIG. 7(a) is a perspective view of the tank, showing a cross section of a ceiling portion of the tank wall, which is cut along the longitudinal direction, according to the first embodiment.
FIG. 7(b) is a cross-sectional view of the tank, showing a generating area of an internal stress of the ceiling portion of the tank of FIG. 7(a).
Figure 7:
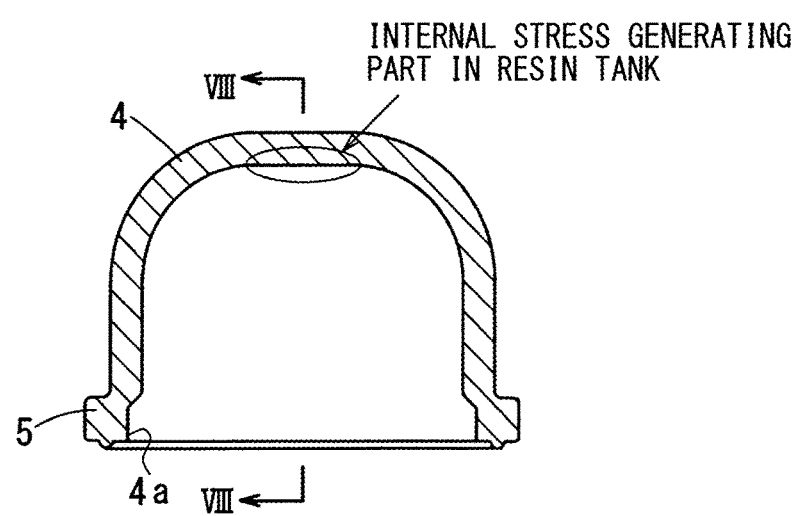

The internal stress, which is generated in the tank, is shown in a cut model of the tank 1 prepared by cutting the ceiling portion of the tank wall 4 in FIG. 7(a) along the longitudinal direction L. Specifically, an internal stress generating part (a part surrounded by a circle in FIG. 7(b)) of the tank ceiling portion shown in FIG. 7(b) is checked in a cross section taken along line VIII-VIII in FIG. 7(b) (see FIGS. 8(a) to 8(c)).

Figure 8:
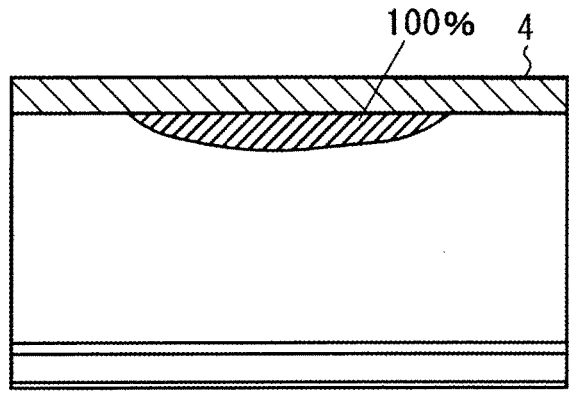
FIGS. 8(a) to 8(c) are cross-sectional views showing simulation results for analyzing a stress state of the tank.
Figure 8:
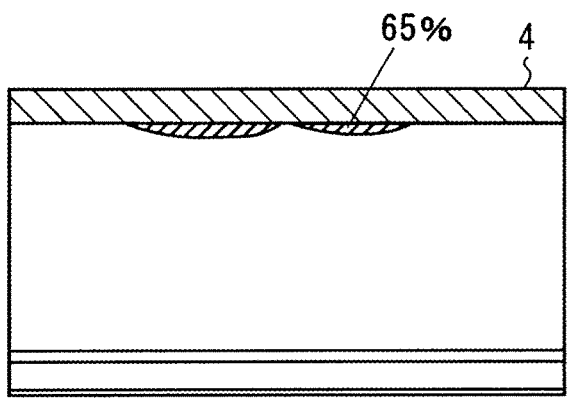
Figure 8:
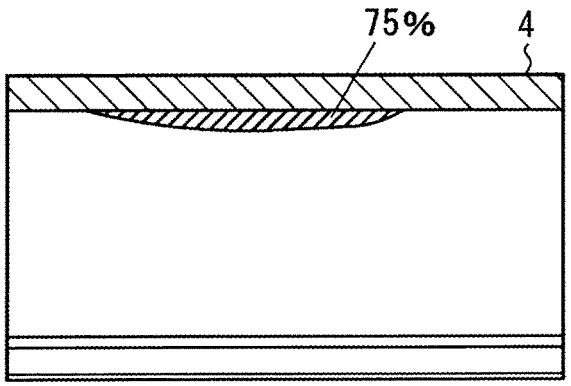

FIGS. 8(a) to 8(c) show simulation results of the internal stress. Specifically, FIG. 8(a) shows the prior art model. FIG. 8(b) shows the present embodiment model. Apart from the prior art model and the present embodiment model, FIG. 8(c) shows a reference model, in which the glass fibers are oriented in a direction that is angled 45 degrees relative to the longitudinal direction L of the tank 1. A hatching area in FIGS. 8(a) to 8(c) is an area, at which a maximum internal stress is generated in the tank wall 4 of the tank 1. Hereinafter, the area, in which the maximum internal stress is generated, i.e., the hatching area shown in FIGS. 8(a) to 8(c), will be referred to as a maximum stress generating area.

In comparison between the prior art model and the present embodiment model, it is found that the maximum stress generating area of the present embodiment is 65% of the maximum stress generating area of the prior art model in the case where the maximum stress generating are of the prior art model is 100%. That is, the present embodiment model can reduce the maximum stress generating area by about 35% in comparison to the prior art model.

Furthermore, the maximum stress generating area of the reference model is 75% of the prior art model, and thereby the reference model can reduce the maximum stress generating area by about 25% in comparison to the prior art model. However, in comparison of the reference model with the present embodiment model, the maximum stress generating area is increased by about 10%.

As discussed above, in the present embodiment model, in comparison to the prior art model and the reference model, the maximum stress generating area is reduced, and thereby it is understood that the present embodiment model has the high strength with respect to the tank internal pressure.

Next, an actual device (an actual tank formed by the resin molding) of the prior art model is produced through use of the gate position GP of the prior art model, and an actual device (an actual tank formed by the resin molding) of the present embodiment model is produced through use of the gate position GP of the present embodiment model. A strength test is performed on the actual device of the prior art model and the actual device of the present embodiment model. This test is a creep test performed under a high temperature and a high pressure. In the creep test, a time period, which is from the time of starting the creep test to the time of fracturing of the tank, is measured. The strength of the tank 1 is evaluated based on a length of the measured time period. Hereinafter, the actual device of the prior art model will be referred to as a prior art tank, and the actual device of the present embodiment model will be referred to as a present embodiment tank.

Figure 9:
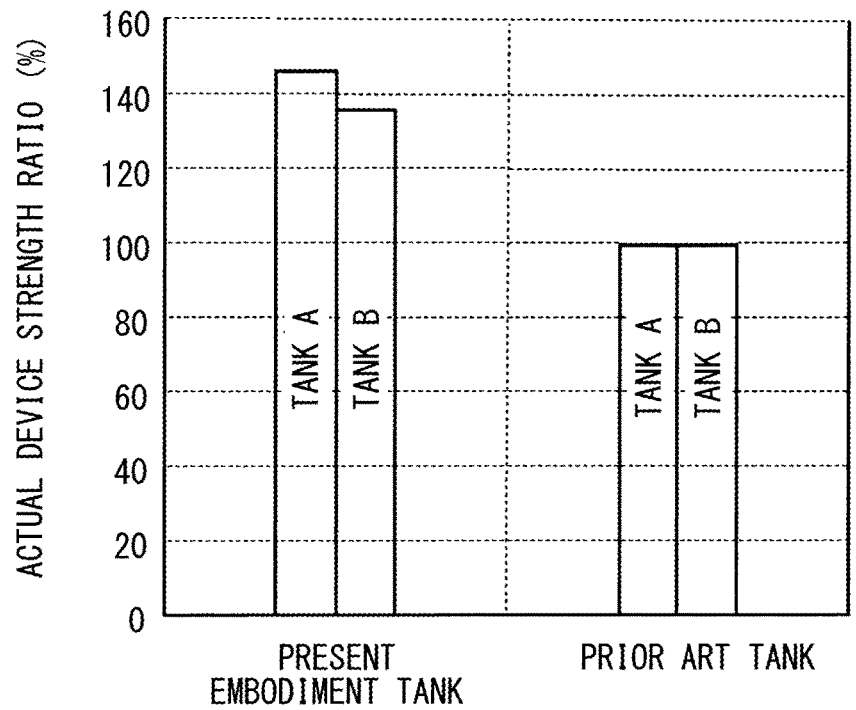
FIG. 9 is an evaluation diagram showing a bar graph, which indicates a strength ratio between the tank of the prior art and the tank of the first embodiment.

FIG. 9 shows a bar graph, which indicates a strength ratio between the prior art tank and the present embodiment tank. In the bar graph of FIG. 9, the strength ratio of the prior art tank is indicated as 100%.

The results of the creep test indicate that the strength ratio of the present embodiment tank relative to the prior art tank is about 140%, and the strength of the present embodiment tank is about 1.4 times higher than that of the prior art tank. In other words, a lifetime of the present embodiment tank until the time of fracturing of the tank is about 1.4 times longer than that of the prior art tank, and thereby the present embodiment tank shows the higher durability in comparison to the prior art tank.

A tank A and a tank B shown in FIG. 9 are provided to show a size difference of the tank 1. The tank A has a longer size in the longitudinal direction and a wider size in the lateral direction in comparison to the tank B. In comparison to the prior art tank, the strength ratio of the present embodiment tank is higher than the strength ratio of the prior art tank regardless of the sizes of the tank 1.

(Effects and Advantages of First Embodiment)

The tank 1 of the first embodiment has the gate position GP in the one side surface 5a of the tank foot 5, which extends in the longitudinal direction L of the tank wall 4, and this gate position GP is placed at the one location in the center portion of the tank foot 5 centered in the longitudinal direction L. In this case, as shown in FIG. 4, the resin, which is filled from the gate position GP, flows along the curved cross section of the tank wall 4 (the cross section that is perpendicular to the longitudinal direction L) in the center portion in the ceiling portion of the tank wall 4, at which the internal pressure load is large. In this way, the flow is in the reinforcing direction with respect to the direction (the C-C direction in FIG. 4) of deformation of the tank 1 caused by the internal pressure load to uniformly orient the glass fibers in the direction of deformation of the tank 1. Thereby, as is obvious from the simulation result of the tank models and the result of the strength test using the actual devices, the strength and the durability of the tank 1 are improved.

Furthermore, since the gate position GP is placed in the one location, the molded product, which is released from the cavity 200 after the cooling and solidifying of the molded product upon the molding of the molded product in the injection molding die M, will not have a weld line, which would be otherwise generated by collision of resin flows directed different directions, respectively. Therefore, it is possible to limit a reduction in the strength of the tank 1 caused by the generation of the weld line.

Second Embodiment

Figure 10:
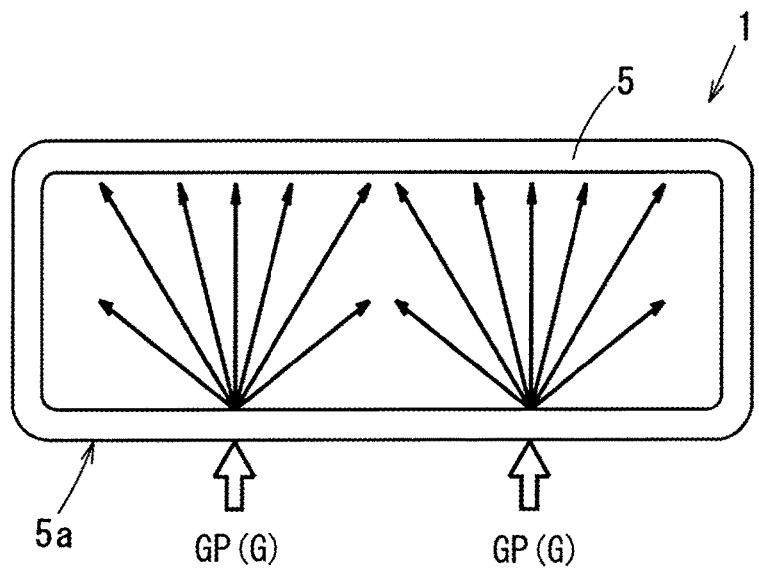
FIG. 10 is a plan view of a tank according to a second embodiment of the present disclosure.

As shown in FIG. 10, a second embodiment of the present disclosure is an example, in which the gate positions GP is placed in a plurality of locations (two locations in FIG. 10) in the side surface 5a of the tank foot 5, which extends in the longitudinal direction L. Specifically, the second embodiment is the example, in which the gate G is placed in the plurality of locations (the two locations in the present embodiment) in the side wall 200a of the cavity 200 of the injection molding die M shown in FIG. 3 of the first embodiment.

In this case, the resin, which is filled from one of the gates G (the gate positions GP), and the resin, which is filled from the other one of the gates G (the gate positions GP), flow generally in a common direction. That is, in the entire extent of the tank 1 in the longitudinal direction L, the flow of the resin is generated along the curved cross section of the tank wall 4 from the one tank foot side, in which the gate positions GP are placed, to the other tank foot side. In this way, in the ceiling portion of the tank wall 4, in which the internal pressure load is large, the flow of the resin is generated in the reinforcing direction with respect to the direction of deformation of the tank 1 to uniformly orient the glass fibers in the direction of deformation of the tank 1. Therefore, the strength and the durability of the tank 1 are improved.

The Patent Literature 2 discussed above discloses the prior art technique, in which the gate position GP is placed in the lateral surface and the longitudinal surface of the tank 1. In such a case, the direction of the flow of the resin, which is filled from the gate position GP placed in the lateral surface of the tank 1, is substantially different from the direction of the flow of the resin, which is filled from the gate position GP placed in the longitudinal surface of the tank 1. Therefore, a deep weld line is formed in an area, at which these two flows of the resin merge with each other.

In contrast, in the second embodiment, the plurality of gate positions GP is placed in the common tank foot 5. Therefore, the resin, which is filled from each gate position GP into the cavity, tends to flow in the direction, which is along the cross section of the tank wall 4 and is perpendicular to the longitudinal direction L of the tank 1. That is, there is no substantial difference between the directions of the flows of the resin, which are filled from the respective gate positions GP into the cavity, and these flows of the resin are generally in the common direction. Therefore, in comparison to the Patent Literature 2, it is possible to limit the generation of the weld line. Thereby, it is possible to limit the reduction in the strength of the tank 1 caused by the generation of the weld line.

Third Embodiment

Figure 11:
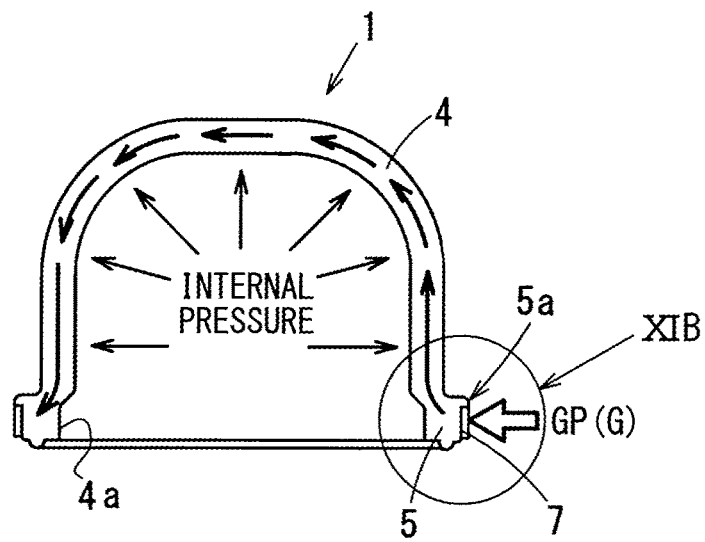
FIG. 11(a) is a cross-sectional view of a tank, showing a cross section of the tank taken along a direction, which is perpendicular to a longitudinal direction of the tank, according to a third embodiment of the present disclosure.
FIG. 11(b) is an enlarged cross-sectional view showing an area XIB in FIG. 11(a).
Figure 11:
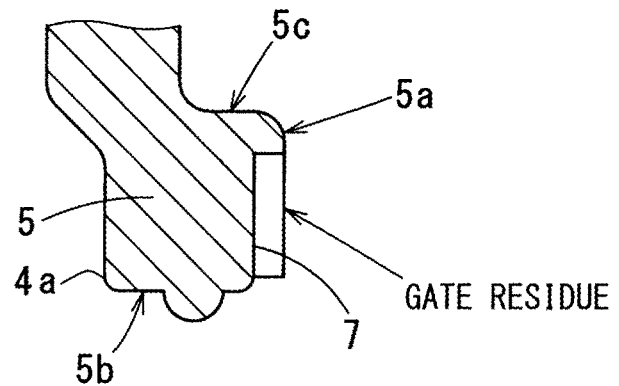

A third embodiment of the present disclosure is a modification of the first embodiment or the second embodiment. As shown in FIG. 11(a), the third embodiment is an example, in which a recess 7 is formed in the side surface 5a of the tank foot 5, and the gate position GP is placed in the recess 7.

In a case where a gate trace, which is left after the filling of the resin, outwardly projects from the side surface 5a of the tank foot 5, it may possibly cause a crimping failure, such as shortage of the crimping strength at the time of crimping the end part of the core plate 3 to the tank foot 5 or disablement of normal crimping of the end part of the core plate 3 to the tank foot 5. Therefore, in such a case, a post-process, which cuts the gate trace, is required.

In contrast to this, as shown in FIG. 11(b), when the gate position GP is placed in the recess 7, which is formed in the side surface 5a of the tank foot 5, it is possible to limit the outward projection of the gate trace (a gate residue in the drawing) from the side surface 5a of the tank foot 5. Here, it is desirable that a depth of the recess 7 is set to avoid the outward projection of the gate trace from the side surface 5a of the tank foot 5. In this way, it is not required to have the post-process to cut the gate trace, and it is possible to limit the crimping failure of the core plate 3, which would be caused by the remaining of the gate trace.

Furthermore, at the time of forming the recess 7 in the side surface 5a of the tank foot 5, it is possible to leave a corner, which may be used as a base point at the time of crimping the core plate 3 against the tank foot 5.

Figure 12:
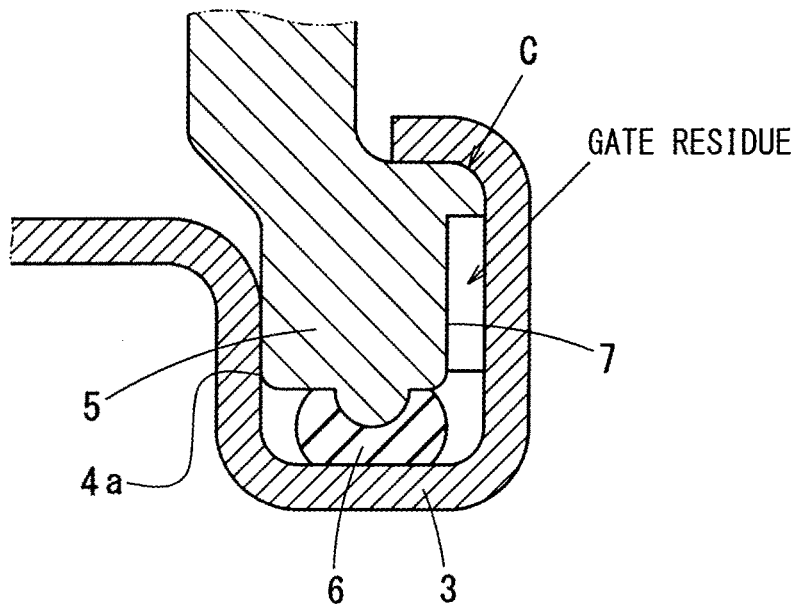
FIG. 12 is a cross-sectional view, showing a state where a core plate is fixed to a tank foot of FIG. 11(b) by crimping through a packing.

That is, with respect to the tank foot 5 shown in FIG. 11(b), in a case where an end surface of the tank foot 5, which clamps the packing 6 in cooperation with the core plate 3, is defined as a seal surface 5b, and an opposite surface of the tank foot 5, which is opposite from the seal surface 5b and is engaged with the end part of the core plate 3, is defined as an engaging surface 5c, the recess 7, in which the gate position GP is placed, is recessed in a state where a portion of the side surface 5a of the tank foot 5 is left in the engaging surface 5c side. With the above construction, as shown in FIG. 12, since the portion of the side surface 5a of the tank foot 5 is left at the engaging surface 5c side of the recess 7, the end part of the core plate 3 can be fixed to the tank foot 5 by crimping while a corner C, at which the side surface 5a of the tank foot 5 and the engaging surface 5c are merged with each other, is used as the base point. That is, even when the recess 7 is formed in the side surface 5a of the tank foot 5 to place the gate position GP in the recess 7, the crimping performance of the foot 5 with the core plate 3 is not deteriorated due to the provision of the corner C. Thereby, it is possible to achieve the crimping performance, which is equivalent to the crimping performance in the case where the recess 7 is not formed in the side surface 5a of the tank foot 5.

Modifications

In the first to third embodiments, the example of the tank 1 used in the radiator is discussed. Alternatively, the tank of the present disclosure may be used as a resin tank of another heat exchanger, which is other than the radiator and is, for example, a heater core for heating air, an intercooler for cooling air compressed by a supercharger, or an EGR cooler used in an EGR apparatus for recirculating a portion of exhaust gas into intake air.

In the first to third embodiments, the glass fibers are added in the resin material as the reinforcing material. However, the reinforcing material is not limited to the glass fibers. For example, carbon fibers may be used as the reinforcing material.

In the first embodiment, there is discussed the example, in which the gate position GP is placed in the center portion of the tank foot 5, which is centered in the longitudinal direction L. However, it is not absolutely necessary to place the gate position GP in the center portion of the tank foot 5. For example, the gate position GP may be placed in another location, which is deviated from the center portion of the tank foot 5 toward the one end of the tank foot 5 in the longitudinal direction L or the other end of the tank foot 5 in the longitudinal direction L.

Figure 13:
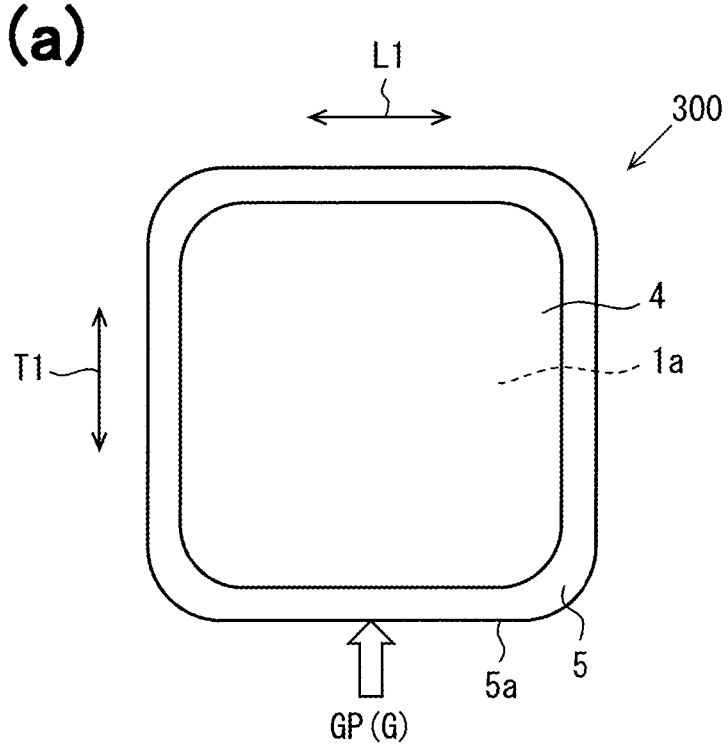
FIG. 13(a) is a plan view showing a modification of the tank of the first embodiment.
FIG. 13(b) is a plan view showing a modification of the tank of the second embodiment.
Figure 13:
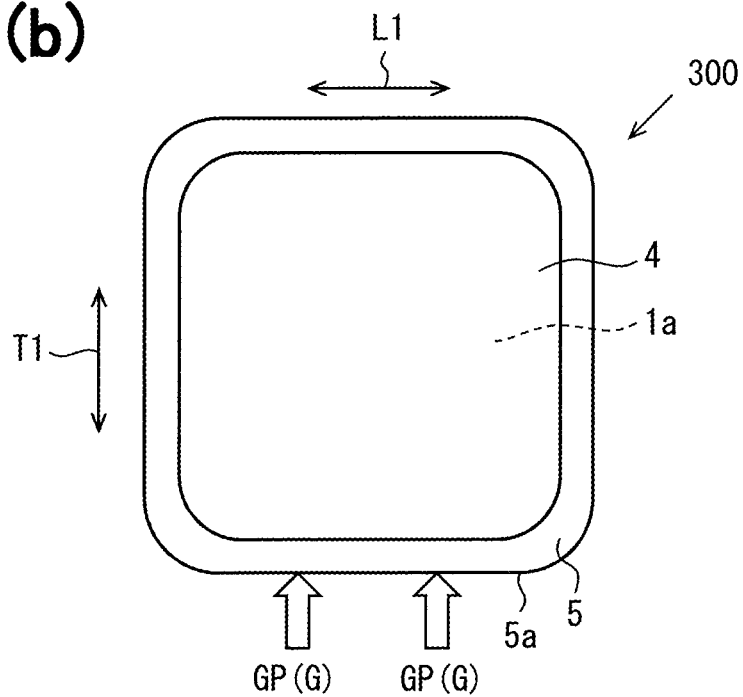
Figure 14:
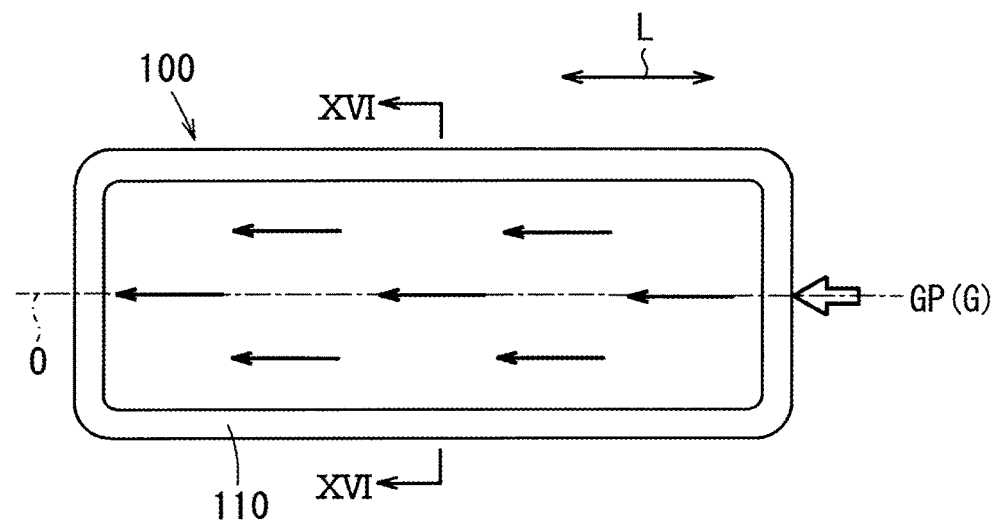
FIG. 14 is a plan view of the tank of a prior art.
Figure 15:
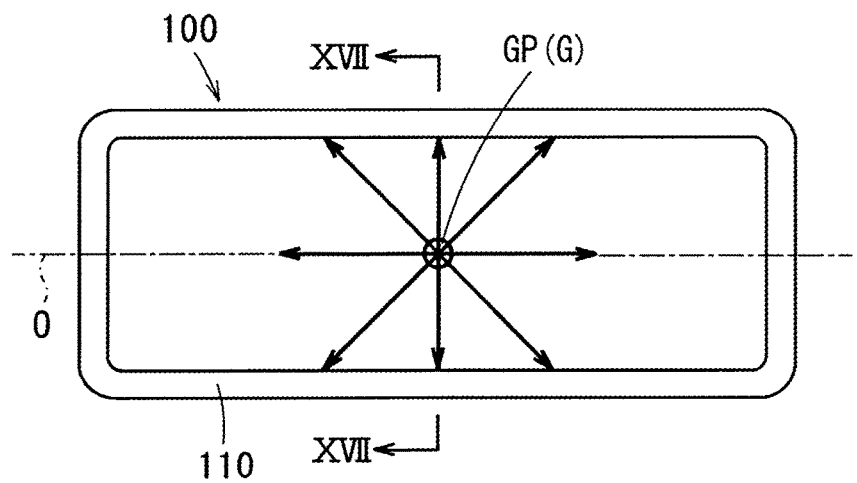
FIG. 15 is a plan view of another tank of a prior art.
Figure 16:
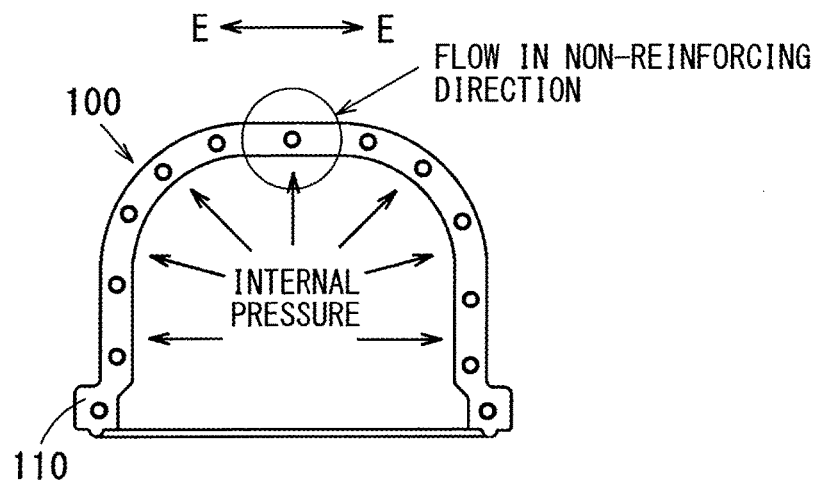
FIG. 16 is a cross sectional view taken along line XVI-XVI in FIG. 14.
Figure 17:
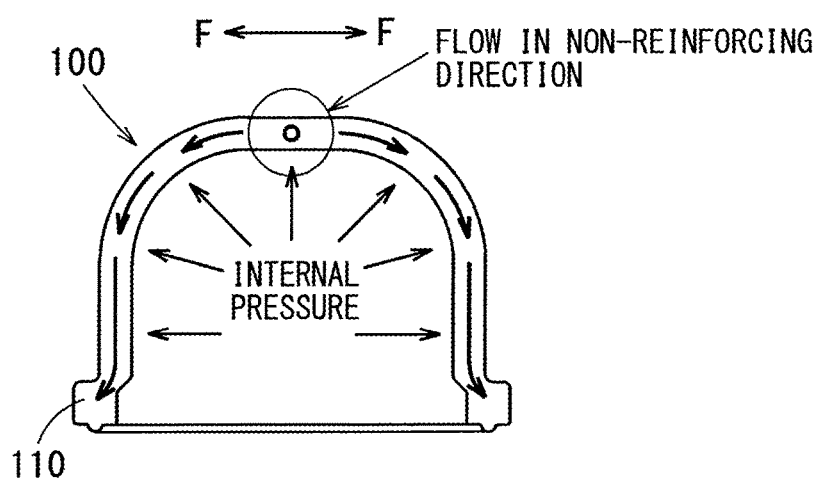
FIG. 17 is a cross-sectional view taken along line XVII-XVII in FIG. 15.
Figure 18:
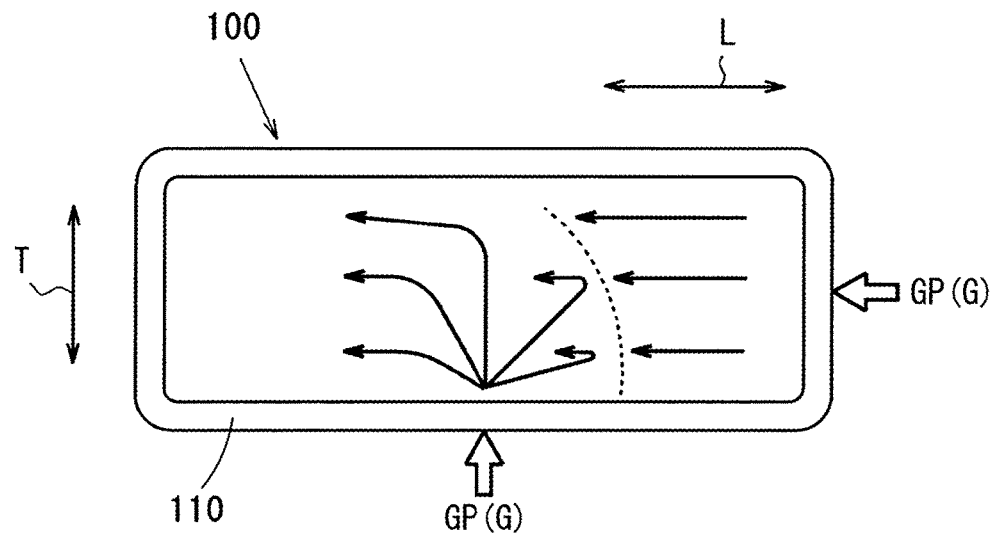
FIG. 18 is a plan view of a tank of the Patent Literature 2.
Figure 19:
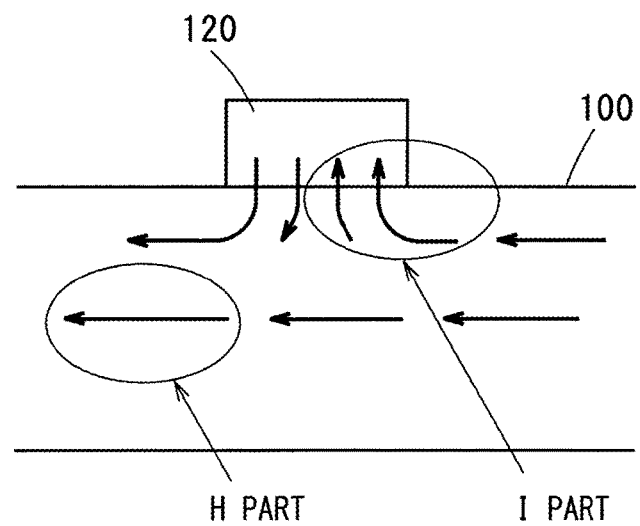
FIG. 19 is a schematic view showing a flow of resin in the tank of the Patent Literature 2.

In the first to third embodiments, there is described the tank 1, which is configured into the generally rectangular form (the generally oblong form) having the longitudinal direction L and the lateral direction T. However, the present disclosure is not limited to the tank 1 configured into the generally rectangular form. For instance, the present disclosure may be applied to a tank 1, which has an opening that is configured into a generally square form. For example, as in a case of a modification of the first embodiment shown in FIG. 13(a), it is possible to use a tank 300 that includes a tank wall 4. The tank wall 4 of the tank 300 has an opening 1a, which is configured into a generally square form that extends in a first direction L1 and a second direction T1 that are perpendicular to each other. A cross section of the tank wall 4, which is perpendicular to the first direction L1 of the opening 1a, is curved like in the first embodiment. The shape of the tank 300 shown in FIG. 13(a) in a plan view is the generally square form, and one side surface 5a of the tank foot 5, which extends in the first direction L1 of the tank wall 4, has the gate position GP, which is placed in a center portion of the side surface 5a that is centered in the first direction L1. Alternatively, as in a case of a modification of the second embodiment shown in FIG. 13(b), the tank 300, which has the shape similar to the modification of FIG. 13(a), i.e., is configured to have the generally square form in the plan view (the tank having the opening 1a configured into the generally square form) may be provided, and the gate position G may be placed at a plurality of locations in the side surface 5a of the tank foot 5, which extends in the first direction of the tank wall 4. Furthermore, the gate position GP of each of the modifications shown in FIG. 13(a) and FIG. 13(b) may be placed in the recess 7 like in the third embodiment.

What is claimed is:

1. A tank for a heat exchanger, comprising a tank wall that has an opening, which is configured into a generally rectangular form that extends in a longitudinal direction and a lateral direction that are perpendicular to each other, wherein a cross section of the tank wall, which is perpendicular to the longitudinal direction of the opening, is curved, and a tank foot is formed to extend all around the opening of the tank wall and is configured to be joined with a core plate, wherein:
   the tank wall is a resin-molded product that is molded by filling fiber-mixed resin, in which fibers are added as a reinforcing material, into an injection molding die; and
   the tank further includes a gate trace located on the tank at a gate position, the gate position corresponding to a location where a gate is provided in the injection molding die to fill the fiber-mixed resin through the gate during the formation of the tank, and the gate trace outwardly projecting from the tank after the filling of the fiber-mixed resin during formation of the tank, and placed only on one side surface out of all side surfaces of the tank foot, the one side surface extending in the longitudinal direction of the tank wall, and in at least one location on the one side surface of the tank foot.

2. The tank according to claim 1, wherein the at least one location of the one side surface of the tank foot includes only one location.

3. The tank according to claim 2, wherein the one location of the one side surface of the tank foot is in a center portion of the one side surface of the tank foot, which is centered in the longitudinal direction.

4. The tank according to claim 1, wherein the at least one location of the one side surface of the tank foot includes a plurality of locations.

5. A tank for a heat exchanger, comprising a tank wall that has an opening, which is configured into a generally square form that extends in a first direction and a second direction that are perpendicular to each other, wherein a cross section of the tank wall, which is perpendicular to the first direction of the opening, is curved, and a tank foot is formed to extend all around the opening of the tank wall and is configured to be joined with a core plate, wherein:
   the tank wall is a resin-molded product that is molded by filling fiber-mixed resin, in which fibers are added as a reinforcing material, into an injection molding die; and
   the tank further includes a gate trace located on the tank at a gate position, the gate position corresponding to a location where a gate is provided in the injection molding die to fill the fiber-mixed resin through the gate during the formation of the tank, and the gate trace outwardly projecting from the tank after the filling of the fiber-mixed resin during formation of the tank, and placed only on one side surface out of all side surfaces of the tank foot, the one side surface extending in the first direction, and in at least one location on the one side surface of the tank foot.

6. The tank according to claim 5, wherein the at least one location of the one side surface of the tank foot includes only one location.

7. The tank according to claim 6, wherein the one location of the one side surface of the tank foot is in a center portion of the one side surface of the tank foot, which is centered in the one of the first direction and the second direction.

8. The tank according to claim 5, wherein the at least one location of the one side surface of the tank foot includes a plurality of locations.

9. The tank according to claim 5, wherein the gate position in the one side surface of the tank hoot is provided with a recess, and the gate position is formed in the recess.

10. The tank according to claim 9, wherein:
an end portion of the core plate is fixed to the tank foot by crimping through a packing, which has resiliency;
an end surface of the tank foot, which clamps the packing between the end surface of the tank foot and the core plate, forms a seal surface;
a surface of the tank foot, which is opposite from the seal surface and is engaged with the end portion of the core plate by the crimping, forms an engaging surface; and
the recess, in which the gate position is formed, is recessed such that a portion of the one side surface of the tank foot is left on a side where the engaging surface is located.

11. The tank according to claim 1, wherein the gate position in the one side surface of the tank foot is provided with a recess, and the gate position is formed in the recess.

12. The tank according to claim 11, wherein:
an end portion of the core plate is fixed to the tank foot by crimping through a packing, which has resiliency;
an end surface of the tank foot, which clamps the packing between the end surface of the tank foot and the core plate, forms a seal surface;
a surface of the tank foot, which is opposite from the seal surface and is engaged with the end portion of the core plate by the crimping, forms an engaging surface; and
the recess, in which the gate position is formed, is recessed such that a portion of the one side surface of the tank foot is left on a side where the engaging surface is located.

13. The tank according to claim 1, wherein the gate position is located to allow the fiber-mixed resin to flow along the cross section of the tank wall in a direction perpendicular to the longitudinal direction of the tank wall during formation of the tank.

14. The tank according to claim 5, wherein the gate position is located to allow the fiber-mixed resin to flow along the cross section of the tank wall in a direction perpendicular to the longitudinal direction of the tank wall during formation of the tank.

\* \* \* \* \*